(12) United States Patent
Asano et al.

(10) Patent No.: US 7,363,912 B2
(45) Date of Patent: Apr. 29, 2008

(54) FUEL INJECTION CONTROLLER FOR ENGINE

(75) Inventors: Masahiro Asano, Kariya (JP); Eiji Takemoto, Obu (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/822,050

(22) Filed: Jul. 2, 2007

(65) Prior Publication Data

US 2008/0006244 A1 Jan. 10, 2008

(30) Foreign Application Priority Data

Jul. 7, 2006 (JP) .............................. 2006-187609

(51) Int. Cl.
*F02M 7/00* (2006.01)
*F02D 41/00* (2006.01)

(52) U.S. Cl. ...................................... 123/436; 123/674

(58) Field of Classification Search ................ 123/478, 123/299, 294, 295, 305, 300, 674, 486, 436; 701/104, 102, 115
See application file for complete search history.

(56) References Cited

U.S. PATENT DOCUMENTS

| | | | | |
|---|---|---|---|---|
| 6,755,176 B2 * | 6/2004 | Takeuchi et al. | ............ | 123/299 |
| 6,907,861 B2 * | 6/2005 | Asano et al. | ................ | 123/395 |
| 6,910,458 B2 * | 6/2005 | Oki | ......................... | 123/198 F |
| 6,985,807 B2 * | 1/2006 | Asano et al. | ................ | 701/104 |
| 6,988,030 B2 * | 1/2006 | Asano et al. | ................ | 701/103 |
| 6,990,950 B2 * | 1/2006 | Asano et al. | ................ | 123/299 |
| 6,990,958 B2 * | 1/2006 | Asano et al. | ................ | 123/436 |
| 7,032,582 B2 * | 4/2006 | Asano et al. | ................ | 123/674 |
| 7,269,500 B2 * | 9/2007 | Cochet et al. | ............. | 701/114 |
| 2004/0267433 A1 * | 12/2004 | Asano et al. | ................ | 701/104 |
| 2004/0267434 A1 * | 12/2004 | Asano et al. | ................ | 701/104 |
| 2005/0092298 A1 * | 5/2005 | Asano et al. | ................ | 123/435 |
| 2005/0092300 A1 * | 5/2005 | Asano et al. | ................ | 123/436 |
| 2005/0098158 A1 * | 5/2005 | Asano et al. | ................ | 123/436 |
| 2005/0107943 A1 * | 5/2005 | Asano et al. | ................ | 701/104 |
| 2005/0109322 A1 * | 5/2005 | Asano et al. | ................ | 123/436 |
| 2007/0112502 A1 * | 5/2007 | Asano et al. | ................ | 701/111 |

* cited by examiner

*Primary Examiner*—Mahmoud Gimie
(74) *Attorney, Agent, or Firm*—Nixon & Vanderhye P.C.

(57) ABSTRACT

A fuel injection controller calculates a difference between a rotation speed fluctuation amount of an engine in the case where an injection for learning is performed and the rotation speed fluctuation amount in the case where the injection for the learning is not performed as a rotation speed increase amount. The controller calculates an actual injection amount actually injected from an injector based on a rotation state of the engine. The controller calculates a difference between the actual injection amount and a command injection amount outputted to the injector as a characteristic deviation and corrects the command injection amount to reduce the characteristic deviation. The controller prohibits the correction of the command injection amount when a variation in the rotation speed increase amount is equal to or greater than a specified value.

14 Claims, 3 Drawing Sheets

FUEL INJECTION CONTROLLER FOR ENGINE

CROSS REFERENCE TO RELATED APPLICATION

This application is based on and incorporates herein by reference Japanese Patent Application No. 2006-187609 filed on Jul. 7, 2006.

BACKGROUND OF THE INVENTION

1. Field of the Invention

The present invention relates to a fuel injection controller that performs injection amount learning of an engine.

2. Description of Related Art

Conventionally, a method of performing a pilot injection of injecting an extremely small amount of fuel before a main injection is known as a measure for reducing a combustion noise or for inhibiting NOx of a diesel engine. In the case of the pilot injection with a small command value of the injection amount, improvement of accuracy of the minute amount injection is required in order to fully exert the effects (i.e., reduction of combustion noise and inhibition of NOx). Therefore, injection amount learning of sensing a deviation between the command injection amount of the pilot injection and the actually injected fuel amount (i.e., actual injection amount) and performing correction on a software side is needed.

Therefore, a following technology is proposed, for example, in JP-A-2005-36788. That is, in a M/T vehicle, a single-shot injection (i.e., injection for learning) is performed at a time of no-load such as a time of shift change (i.e., at time of clutch-cut) and of no-injection during deceleration. The actual injection amount at that time is estimated from a change of an engine rotation state (for example, amount of fluctuation of engine rotation speed). An injection amount characteristic deviation of an injector is calculated based on the thus-estimated actual injection amount and the command injection amount. Then, the command injection amount is corrected to decrease the injection amount characteristic deviation.

A fuel injection controller described in JP-A-2005-36788 performs the injection for the learning only when the clutch is disengaged, in order to accurately sense the change of the engine rotation state caused by the injection. In an A/T vehicle, such the state (i.e., neutral state) is rare. Therefore, when this scheme is applied to a diesel engine of the A/T vehicle, there are few opportunities of the injection amount learning.

So, in the case of the A/T vehicle, it is proposed to perform the injection amount learning when an engine side and a transmission side (extending from transmission to wheels) are engaged but are not locked up. However, disturbances such as a road noise and torsional vibration are added to the engine side from the transmission side. Therefore, the sensing accuracy of the change of the engine rotation state worsens, so the learning accuracy worsens.

Even in the case where the scheme is applied to the diesel engine of the M/T vehicle, if a damper is attached to a flywheel, a delay or the like can arise in the fluctuation of the engine rotation speed caused by the injection for the learning. Accordingly, the sensing accuracy of the change of the engine rotation state worsens, so the learning accuracy worsens.

SUMMARY OF THE INVENTION

It is an object of the present invention to prevent or inhibit lowering of learning accuracy of a fuel injection controller, which performs injection amount learning of an engine, due to a disturbance.

According to an aspect of the present invention, a fuel injection controller of an engine calculates a difference between a rotation state of the engine in the case where an injection for learning is performed and the rotation state of the engine in the case where the injection for the learning is not performed as a rotation speed index value. The fuel injection controller calculates an actual injection amount actually injected from an injector based on the rotation state of the engine and calculates a difference between the actual injection amount and a command injection amount outputted to the injector as a characteristic deviation. The fuel injection controller corrects the command injection amount to decrease the characteristic deviation. The fuel injection controller sets a lower degree of the correction of the command injection amount in the case where a variation in the rotation speed index values is equal to or greater than a specified value than a degree of the correction of the command injection amount in the case where the variation in the rotation speed index values is less than the specified value.

The degree of the correction of the command injection amount is reduced when it is determined that a disturbance is added during the injection amount learning. Accordingly, lowering of learning accuracy due to the disturbance can be inhibited.

According to another aspect of the present invention, the fuel injection controller prohibits the correction of the command injection amount when the variation in the rotation speed index values is equal to or greater than the specified value. Thus, when it is determined that the disturbance is added during the injection amount learning, the correction of the command injection amount is prohibited. Accordingly, lowering of the learning accuracy due to the disturbance can be inhibited.

The opportunity of the injection amount learning increases and the injection amount learning can be completed early in the case where the degree of the correction of the command injection amount is reduced when it is determined that the disturbance is added than in the case where the correction of the command injection amount is prohibited when it is determined that the disturbance is added.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
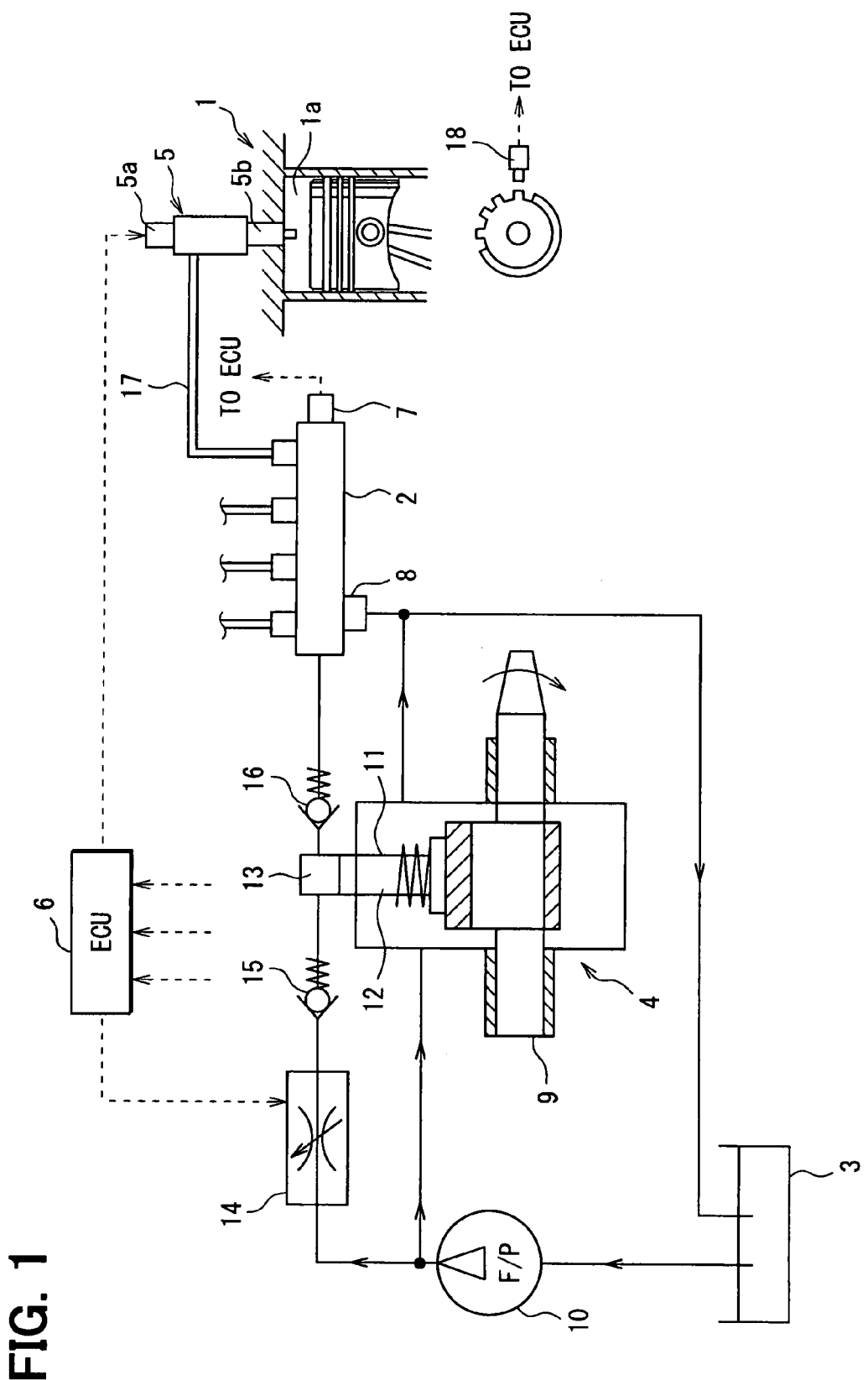
FIG. 1 is a schematic diagram showing a fuel injection system having a fuel injection controller according to a first embodiment of the present invention.

Referring to FIG. 1, a fuel injection system having a fuel injection controller according to a first embodiment of the present invention is illustrated. For example, the fuel injection system shown in FIG. 1 is applied to a four-cylinder diesel engine 1 mounted in an A/T vehicle. In an A/T (not shown) of this vehicle, a transmission is connected with the engine 1 through a fluid coupling. A lockup state can be achieved by engaging the transmission and the engine 1 through a friction clutch.

The fuel injection system has a common rail 2, a fuel supply pump 4, injectors 5, and an electronic control unit 6 (ECU). The common rail 2 stores high-pressure fuel. The fuel supply pump 4 pressurizes the fuel drawn from a fuel tank 3 and supplies the fuel to the common rail 2. The injectors 5 inject the high-pressure fuel supplied from the common rail 2 to combustion chambers 1a of the engine 1. The ECU 6 performs electronic control of the system.

The ECU 6 sets target rail pressure of the common rail 2. The common rail 2 accumulates the high-pressure fuel supplied from the fuel supply pump 4 at the target rail pressure. A pressure sensor 7 and a pressure limiter 8 are attached to the common rail 2. The pressure sensor 7 senses the accumulated fuel pressure (rail pressure) and outputs the value of the sensed pressure to the ECU 6. The pressure limiter 8 restricts the rail pressure such that the rail pressure does not exceed a predetermined upper limit.

The fuel supply pump 4 has a camshaft 9, a feed pump 10, a plunger 12, an electromagnetic metering valve 14, and the like. The camshaft 9 is driven by the engine 1 to rotate. The feed pump 10 is driven by the camshaft 9 to draw the fuel from the fuel tank 3. The plunger 12 reciprocates in a cylinder 11 in synchronization with the rotation of the camshaft 9. The electromagnetic metering valve 14 meters the fuel amount suctioned from the feed pump 10 into a pressurization chamber 13 in the cylinder 11.

In the fuel supply pump 4, when the plunger 12 moves from a top dead center toward a bottom dead center in the cylinder 11, the fuel sent out from the feed pump 10 is metered by the electromagnetic metering valve 14. The fuel pushes and opens an inlet valve 15 and is suctioned into the pressurization chamber 13. Then, when the plunger 12 moves from the bottom dead center toward the top dead center in the cylinder 11, the fuel in the pressurization chamber 13 is pressurized by the plunger 12. The pressurized fuel pushes and opens a discharge valve 16 and is pressure-fed to the common rail 2.

The injectors 5 are mounted in respective cylinders of the engine 1. The injectors 5 are connected to the common rail 2 through high-pressure pipes 17 respectively. Each injector 5 has an electromagnetic valve 5a, which operates based on a command of the ECU 6, and a nozzle 5b, which injects the fuel when the electromagnetic valve 5a is energized. The electromagnetic valve 5a opens and closes a low-pressure passage (not shown) leading from a pressure chamber (not shown) to a low-pressure side. The high-pressure fuel in the common rail 2 is applied to the pressure chamber. The electromagnetic valve 5a opens the low-pressure passage when energized, and blocks the low-pressure passage when de-energized.

The nozzle 5b incorporates a needle (not shown), which opens and closes a nozzle hole. The fuel pressure of the pressure chamber biases the needle in a valve-closing direction (direction for closing nozzle hole). Therefore, if the low-pressure passage is opened because of the energization of the electromagnetic valve 5a and the fuel pressure of the pressure chamber decreases, the needle moves in a valve-opening direction in the nozzle 5b to perform valve-opening (i.e., to open nozzle hole). Thus, the high-pressure fuel supplied from the common rail 2 is injected from the nozzle hole. If the low-pressure passage is blocked because of the de-energization of the electromagnetic valve 5a and the fuel pressure in the pressure chamber increases, the needle moves in the valve-closing direction in the nozzle 5b to perform valve-closing. Thus, the injection ends.

The ECU 6 has a microcomputer consisting of a CPU, a ROM, an EEPROM, a RAM, and the like (not shown). The ECU 6 performs computation processing according to programs stored in the microcomputer. The ECU 6 is connected with a rotation speed sensor 18 for sensing engine rotation speed, an accelerator position sensor (not shown) for sensing a position of an accelerator (i.e., engine load), a pressure sensor 7 for sensing the rail pressure and the like. The ECU 6 calculates the target rail pressure of the common rail 2, fuel injection timing, a fuel injection amount and the like suitable for the operational state of the engine 1 based on sensor information sensed by the sensors. The ECU 6 electronically controls the electromagnetic metering valve 14 of the fuel supply pump 4 and the electromagnetic valves 5a of the injectors 5 according to the calculation result.

Lockup information indicative of existence or nonexistence of a lockup state is inputted from an ECU controlling the A/T of the vehicle to the ECU 6.

In the control of the fuel injection timing and the fuel injection amount by the ECU 6, a pilot injection of an extremely small amount of the fuel is performed before a main injection. The ECU 6 injects the fuel of the amount corresponding to the pilot injection and performs injection amount learning under a predetermined condition.

Figure 2:
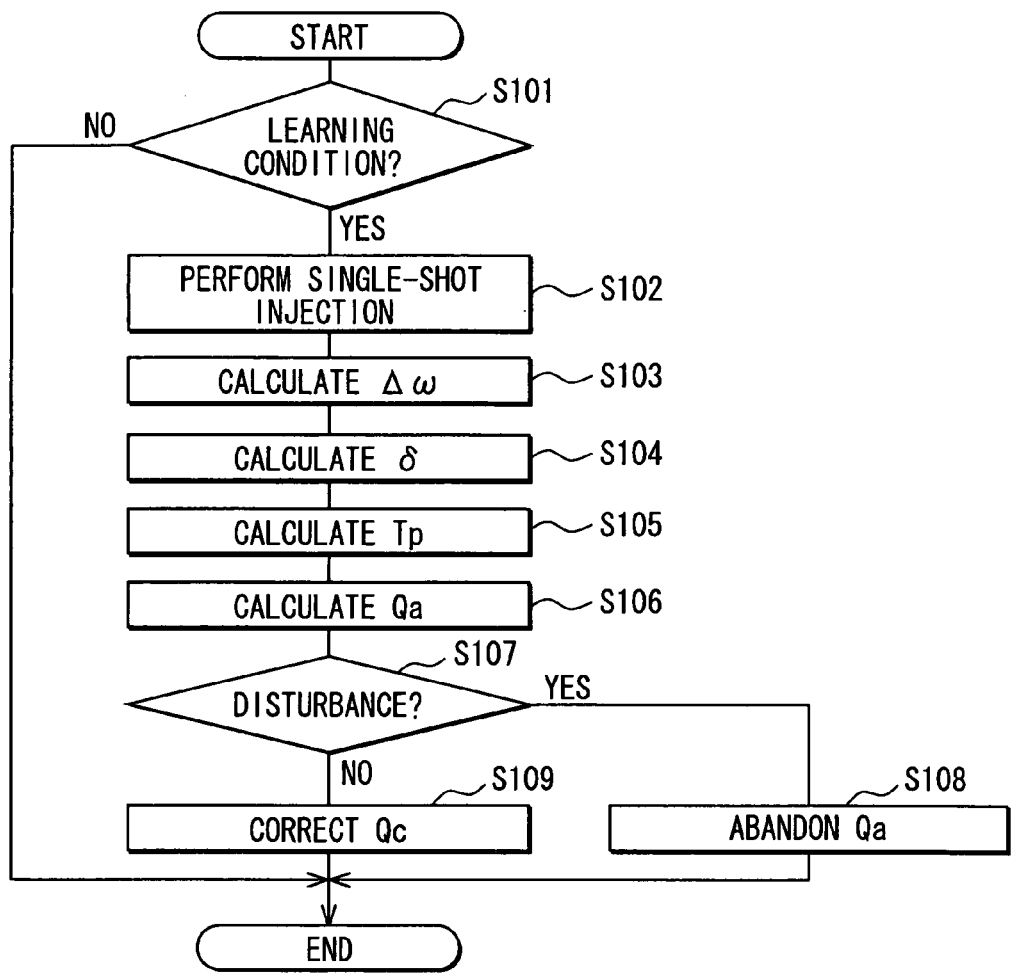
FIG. 2 is a flowchart showing control processing of injection amount learning according to the first embodiment.
Figure 4:
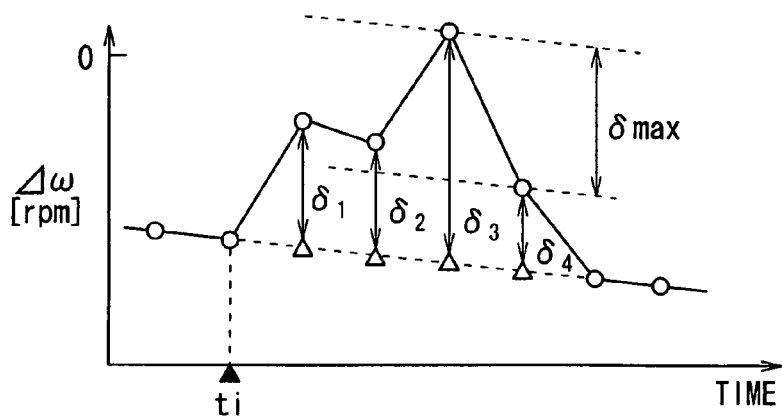
FIG. 4 is a time chart showing the rotation speed fluctuation amount in the case where there is a disturbance during the injection amount learning according to the first embodiment.
Figure 3:
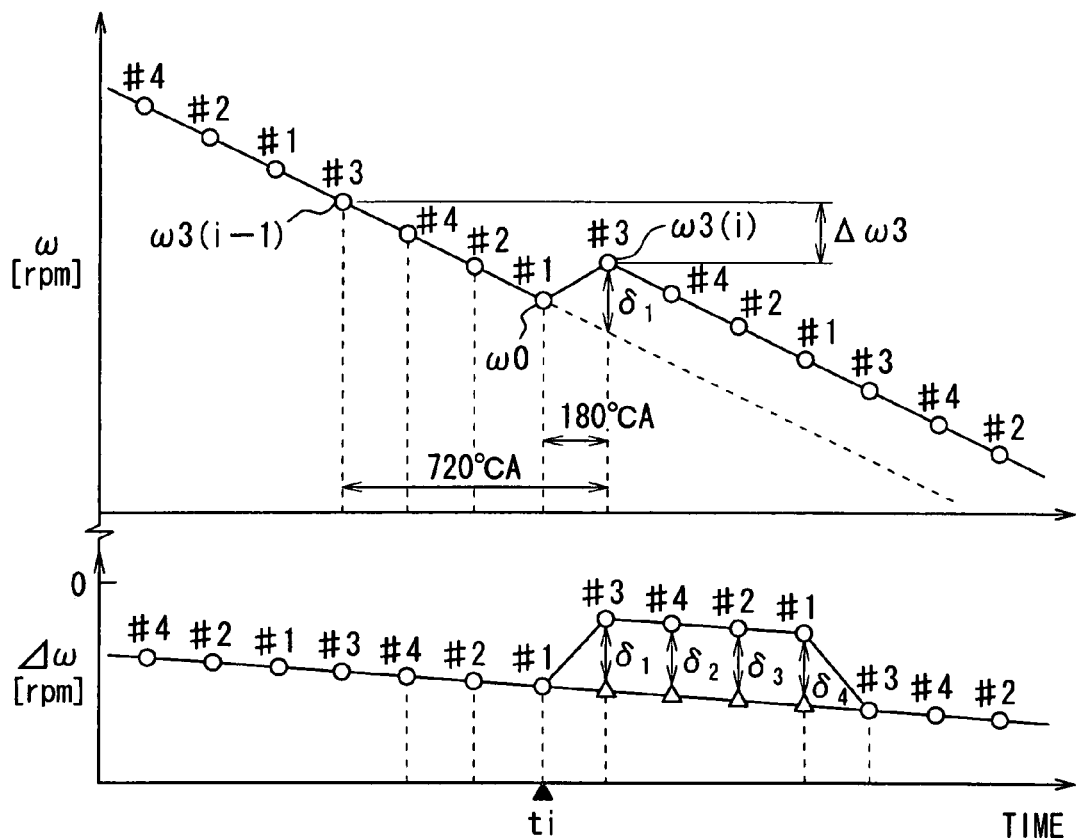
FIG. 3 is a time chart showing engine rotation speed and a rotation speed fluctuation amount in the case where there is no disturbance during the injection amount learning according to the first embodiment.

Next, the injection amount learning according to the present embodiment will be explained. FIG. 2 is a flowchart showing control processing of the injection amount learning performed by the ECU 6. FIG. 3 is a time chart showing the engine rotation speed ω and a rotation speed fluctuation amount Δω in the case where there is no disturbance during the injection amount learning. FIG. 4 is a time chart showing the rotation speed fluctuation amount Δω in the case where there is a disturbance during the injection amount learning.

The control processing shown in FIG. 2 is started if a power is supplied to the ECU 6 by an operation of a key switch when the engine 1 is started. The control processing is ended if the power supply to the ECU 6 is stopped through the operation of the key switch when the engine 1 is stopped.

First, at Step S101, it is determined whether learning conditions for performing the injection amount learning are satisfied. For example, it is determined that the learning conditions are satisfied (S101: YES) when the injection amount from the injector 5 is zero (i.e., no-injection occurs) and the lockup state does not occur. Whether the lockup state occurs or not is determined based on the lockup information outputted from the ECU controlling the A/T. When the lockup state occurs (S101: NO), the learning accuracy is low, so the injection amount learning is not performed.

When Step S101 is YES, the processing proceeds to Step S102. At Step S102, an order is outputted to the injector 5 of a certain cylinder to perform an injection for the learning (single-shot injection). The fuel amount injected through the single-shot injection corresponds to the command injection amount of the pilot injection. In an example shown in FIG. 3, the single-shot injection is performed in the first cylinder (#1) at time ti, and the engine rotation speed ω increases due to the single-shot injection. Then, the processing proceeds to Step S103 to calculate a rotation speed fluctuation amount Δω indicative of the rotation state of the engine 1 as follows.

First, the engine rotation speed ω is sensed with the rotation speed sensor 18. The engine 1 according to the present embodiment has four cylinders. The engine rotation speed ω (rpm) is sensed four times while a crankshaft rotates twice, i.e., the engine rotation speed ω is sensed once for each cylinder every 180° CA. The engine rotation speed ω is sensed immediately before the top dead center of each cylinder.

After the sensing of the engine rotation speed ω, the rotation speed fluctuation amount Δω is calculated for each cylinder. The rotation speed fluctuation amount Δω is calculated as a difference between the engine rotation speed ω of a certain cylinder sensed this time and the engine rotation speed ω of the same cylinder sensed the last time. The rotation speed fluctuation amount Δω is a negative value during engine deceleration. For example, if the third cylinder #3 is taken as an example as shown in FIG. 3, the rotation speed fluctuation amount Δω3 is calculated by subtracting the engine rotation speed ω3(i−1) of the third cylinder #3 sensed the last time (720° CA before) from the engine rotation speed ω3(i) of the same cylinder sensed this time (i.e., Δω3=ω3(i)−ω3(i−1)).

Then, the processing proceeds to Step S104 to calculate rotation speed increase amounts δ1-δ4 of the respective cylinders #1-#4 due to the single-shot injection and an average value δave of the rotation speed increase amounts δ1-δ4 of the four cylinders #1-#4. Each rotation speed increase amount δ as a rotation speed index value is calculated as a difference between the rotation speed fluctuation amount Δω (estimate) in the case where the single-shot injection is not performed and the rotation speed fluctuation amount Δω in the case where the single-shot injection is performed. The rotation speed fluctuation amount Δω during the no-injection decreases monotonously. Therefore, the rotation speed fluctuation amount Δω in the case where the single-shot injection is not performed can be easily estimated from the rotation speed fluctuation amount Δω before the single-shot injection or the rotation speed fluctuation amounts Δω before and after the rotation speed increase.

Then, the processing proceeds to Step S105 to calculate a product of the rotation speed increase amount average δave calculated at Step S104 and the engine rotation speed ω0 at the time when the single-shot injection is performed as a torque proportional amount Tp. At Step S106, the actual injection amount Qa actually injected from the injector 5 at the time of the single-shot injection is estimated from the torque proportional amount Tp calculated at Step S105.

The torque proportional amount Tp is proportional to the torque of the engine 1 generated by the single-shot injection. The generated torque is proportional to the actual injection amount Qa. Therefore, the torque proportional amount Tp is proportional to the actual injection amount Qa. A map defining the relationship between the torque proportional amount Tp and the actual injection amount Qa is stored in the ROM of the ECU 6. The actual injection amount Qa can be calculated from the torque proportional amount Tp using the map.

Then, the processing proceeds to Step S107 to determine existence or nonexistence of the disturbance based on the rotation speed increase amount δ calculated at Step S104.

The magnitude of the rotation speed increase amount δ is decided by the single-shot injection. Therefore, if there is no disturbance, the rotation speed increase amounts δ1-δ4 of the respective cylinders #1-#4 are almost the same values as shown in the example of FIG. 3. If there is a disturbance, the variation among the rotation speed increase amounts δ1-δ4 of the respective cylinders #1-#4 will increase as shown in an example of FIG. 4. Therefore, when a difference δmax between the maximum and the minimum of the rotation speed increase amounts δ1-δ4 is equal to or greater than a threshold δs (for example, 2 rpm), it is estimated that there is a possibility that the disturbance (for example, momentary sudden acceleration or deceleration) is added to the engine 1 side from the transmission side, and it is determined that there is a disturbance (S107: YES).

When Step S107 is YES, the processing proceeds to Step S108. Since the data of the actual injection amount Qa calculated at Step S106 are inaccurate data influenced by the disturbance, the data Qa are abandoned. That is, when Step S107 is YES, correction of the command injection amount Qc is prohibited.

When Step S107 is NO (i.e., when it is determined that there is no disturbance), the processing proceeds to Step S109 to calculate a difference between the command injection amount Qc ordered to the injector 5 at Step S102 and the actual injection amount Qa calculated at Step S106 as a characteristic deviation. The command injection amount Qc is corrected so that the characteristic deviation decreases. That is, when there is a deviation between the command injection amount Qc ordered to the injector 5 at Step S102 and the actual injection amount Qa calculated at Step S106, a set value of energization time length of the electromagnetic valve 5a of the injector 5 as of the single-shot injection is corrected to conform the actual injection amount Qa to the command injection amount Qc.

In the present embodiment, the correction of the command injection amount Qc is prohibited when it is determined that the disturbance is added during the progress of the injection amount learning. Therefore, the injection amount learning can be performed also in the A/T vehicle vulnerable to the disturbance, while suppressing the lowering of the learning accuracy due to the disturbance.

Figure 5:
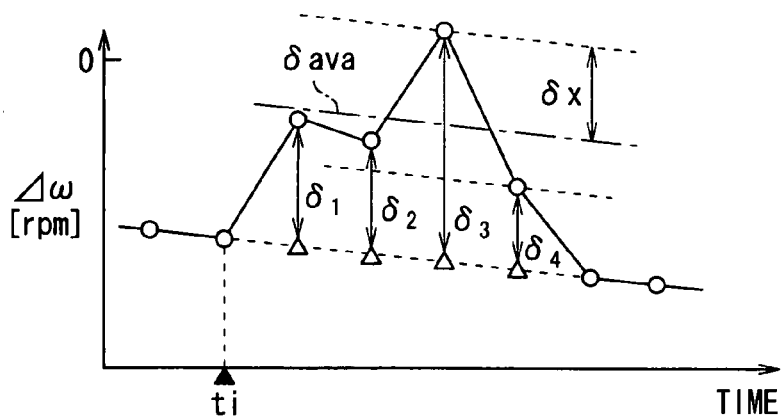
FIG. 5 is a time chart showing a rotation speed fluctuation amount according to a second embodiment of the present invention.

Next, a second embodiment of the present invention will be explained. FIG. 5 is a time chart showing the rotation speed fluctuation amount Δω, which is used in explanation of the fuel injection controller according to the second embodiment.

In the first embodiment, existence or nonexistence of the disturbance is determined at Step S107 (in FIG. 2) based on the difference δmax between the maximum and the minimum of the rotation speed increase amounts δ1-δ4 of the respective cylinders. Alternatively, the existence or nonexistence of the disturbance may be determined based on the maximum value δx of deviation of the rotation speed increase amounts δ1-δ4 from an average δave of the rotation speed increase amounts δ1-δ4 as shown in FIG. 5. For example, when the maximum value δx of the deviation is equal to or greater than a threshold δs (for example, 1-1.5 rpm), it is determined that there is a disturbance.

In the above-described embodiments, it is determined that there is a disturbance (S107 of FIG. 2) when the variation in the rotation speed increase amounts δ1-δ4 is equal to or greater than the threshold δs, and the correction of the command injection amount Qc is prohibited (S108 of FIG. 2). Alternatively, even when the variation in the rotation speed increase amounts δ1-δ4 is equal to or greater than the threshold δs, the correction of the command injection amount Qc may be performed as follows.

That is, when the variation in the rotation speed increase amounts δ1-δ4 is equal to or greater than the threshold δs, a ratio Rδ of the threshold δs to the maximum/minimum difference δmax (Rδ=δs/δmax, Rδ<1) is used as a weighting factor. The weighting factor is set to 1 when the variation in the rotation speed increase amounts δ1-δ4 is less than threshold δs. The difference (characteristic deviation) between the command injection amount Qc ordered to the injector 5 at Step S102 of FIG. 2 and the actual injection amount Qa calculated at Step S106 of FIG. 2 is multiplied by the weighting factor. The setting value of the energization time length of the electromagnetic valve 5a of the injector 5 as of the single-shot injection is corrected in accordance with the characteristic deviation multiplied by the weighting factor.

That is, the correcting degree of the command injection amount Qc in the case where the variation in the rotation speed increase amounts δ1-δ4 is equal to or greater than the threshold is set smaller than the correcting degree of the command injection amount Qc in the case where the variation in the rotation speed increase amounts δ1-δ4 is less than the threshold. Moreover, the correcting degree of command injection amount Qc is reduced as the variation in the rotation speed increase amounts δ1-δ4 increases.

Thus, an opportunity of the injection amount learning can be increased such that the injection amount learning is completed early, while inhibiting lowering of the learning accuracy due to the disturbance. The correcting degree of the command injection amount Qc is reduced as the larger disturbance during the injection amount learning is determined. Accordingly, the injection amount learning can be proceeded, while appropriately inhibiting the lowering of the learning accuracy due to the disturbance.

In the above-described embodiments, the torque proportional amount Tp is calculated by using the average δave of the rotation speed increase amounts δ1-δ4 of the four cylinders (all cylinders) (S105 of FIG. 2). Alternatively, the torque proportional amount Tp may be calculated by using two rotation speed increase amounts δ excluding the maximum and the minimum among the rotation speed increase amounts δ1-δ4 of the four cylinders. Thus, the influence of the disturbance decreases and the learning accuracy can be improved.

In the above-described embodiments, the threshold δs used for the determination of the existence or nonexistence of the disturbance is fixed. The rotation speed increase amount δ decreases as the engine rotation speed ω as of the single-shot injection increases. Therefore, it can be determined more accurately whether the disturbance is added during the injection amount learning by setting the threshold δs smaller as the engine rotation speed ω as of the single-shot injection increases.

In the above-described embodiments, the threshold δs used for the determination of the existence or nonexistence of the disturbance is fixed. The variation in the rotation speed increase amounts δ increases as the command injection amount Qc of the single-shot injection increases. It can be determined more accurately whether the disturbance is added during the injection amount learning by setting the threshold δs greater as the command injection amount Qc as of the single-shot injection increases.

In the above-described embodiments, the present invention is applied to the engine 1 mounted in the A/T vehicle. The present invention is also applicable to the engine 1 mounted in a following M/T vehicle. That is, if a damper is attached to a flywheel of the M/T vehicle, a delay or the like can arise in fluctuation of the engine rotation speed ω caused by the single-shot injection and the rotation speed increase amount δ can vary. In such a case, there is a possibility that the engine rotation speed fluctuation amount distorted by the damper is sensed. Lowering of the learning accuracy can be inhibited by prohibiting the learning when the variation in the rotation speed increase amounts δ is equal to or greater than the threshold δs or by changing the disposal manner of the learning value in accordance with the magnitude of the variation.

In the above-described embodiments, the product of the rotation speed increase amount average δave and the engine rotation speed ω0 as of the single-shot injection is calculated as the torque proportional amount Tp, and the actual injection amount Qa actually injected from the injector 5 during the single-shot injection is estimated from the torque proportional amount Tp. Alternatively, the actual injection amount Qa actually injected from the injector 5 at the time of the single-shot injection may be estimated from the rotation speed increase amount δ as of the single-shot injection or an engine rotation acceleration as of the single-shot injection. In this case, the relationship between the actual injection amount Qa and the rotation speed increase amount δ as of the single-shot injection or the engine rotation acceleration as of the single-shot injection may be measured beforehand, and a map defining the relationship may be stored in the ROM of the ECU 6. Then, the actual injection amount Qa may be obtained by using the map.

In the above-described embodiments, the diesel engine 1 is used. Alternatively, a gasoline engine may be used in place of the diesel engine.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel injection controller of a multi-cylinder engine, the fuel injection controller comprising:
a learning condition determination device that determines whether a learning condition for performing injection for learning from an injector into a specific cylinder of the engine is satisfied;
a learning injection command device that outputs a command injection amount to the injector to perform the injection for the learning into the specific cylinder when the learning condition is satisfied;
an index value calculation device that calculates a difference between a rotation state of the engine in the case where the injection for the learning is performed and the rotation state of the engine in the case where the injection for the learning is not performed as a rotation speed index value;
an injection amount calculation device that calculates an actual injection amount actually injected from the injector based on the rotation state of the engine; and
an injection amount correction device that calculates a difference between the actual injection amount and the command injection amount outputted to the injector as a characteristic deviation and that corrects the command injection amount to decrease the characteristic deviation, wherein the index value calculation device calculates a plurality of rotation speed index values, and the injection amount correction device sets a lower degree of the correction of the command injection amount in the case where a variation in the rotation speed index values is equal to or greater than a specified value than a degree of the correction of the command injection amount in the case where the variation in the rotation speed index values is less than the specified value.

2. The fuel injection controller as in claim 1, wherein the injection amount correction device prohibits the correction of the command injection amount when the variation in the rotation speed index values is equal to or greater than the specified value.

3. The fuel injection controller as in claim 1, wherein the injection amount correction device reduces the degree of the correction of the command injection amount as the variation in the rotation speed index values increases when the variation in the rotation speed index values is equal to or greater than the specified value.

4. The fuel injection controller as in claim 1, wherein the injection amount correction device sets the specified value smaller as the rotation speed of the engine as of the injection for the learning increases.

5. The fuel injection controller as in claim 1, wherein the injection amount correction device sets the specified value larger as the command injection amount increases.

6. The fuel injection controller as in claim 1, wherein the index value calculation device calculates the three or more rotation speed index values, and the injection amount calculation device calculates the actual injection amount based on at least one of the rotation speed index values excluding a maximum and a minimum of the rotation speed index values.

7. The fuel injection controller as in claim 1, wherein the engine is a diesel engine.

8. A fuel injection control method of a multi-cylinder engine, the fuel injection control method comprising:

a learning condition determination step of determining whether a learning condition for performing injection for learning from an injector into a specific cylinder of the engine is satisfied;

a learning injection command step of outputting a command injection amount to the injector to perform the injection for the learning into the specific cylinder when the learning condition is satisfied;

an index value calculation step of calculating a difference between a rotation state of the engine in the case where the injection for the learning is performed and the rotation state of the engine in the case where the injection for the learning is not performed as a rotation speed index value;

an injection amount calculation step of calculating an actual injection amount actually injected from the injector based on the rotation state of the engine; and an injection amount correction step of calculating a difference between the actual injection amount and the command injection amount outputted to the injector as a characteristic deviation and of correcting the command injection amount to decrease the characteristic deviation, wherein the index value calculation step calculates a plurality of rotation speed index values, and the injection amount correction step sets a lower degree of the correction of the command injection amount in the case where a variation in the rotation speed index values is equal to or greater than a specified value than a degree of the correction of the command injection amount in the case where the variation in the rotation speed index values is less than the specified value.

9. The fuel injection control method as in claim 8, wherein the injection amount correction step prohibits the correction of the command injection amount when the variation in the rotation speed index values is equal to or greater than the specified value.

10. The fuel injection control method as in claim 8, wherein the injection amount correction step reduces the degree of the correction of the command injection amount as the variation in the rotation speed index values increases when the variation in the rotation speed index values is equal to or greater than the specified value.

11. The fuel injection control method as in claim 8, wherein the injection amount correction step sets the specified value smaller as the rotation speed of the engine as of the injection for the learning increases.

12. The fuel injection control method as in claim 8, wherein the injection amount correction step sets the specified value larger as the command injection amount increases.

13. The fuel injection control method as in claim 8, wherein the index value calculation step calculates the three or more rotation speed index values, and the injection amount calculation step calculates the actual injection amount based on at least one of the rotation speed index values excluding a maximum and a minimum of the rotation speed index values.

14. The fuel injection control method as in claim 8, wherein the engine is a diesel engine.

* * * * *